UNITED STATES PATENT OFFICE.

WALTER E. WINSHIP, OF SAN FRANCISCO, CALIFORNIA.

ACTIVE MATERIAL FOR STORAGE BATTERIES AND PROCESS OF MAKING SAME.

SPECIFICATION forming part of Letters Patent No. 703,875, dated July 1, 1902.

Application filed March 14, 1901. Serial No. 51,200. (No specimens.)

*To all whom it may concern:*

Be it known that I, WALTER E. WINSHIP, a citizen of the United States, residing in the city and county of San Francisco, State of California, have invented an Improvement in Active Materials for Storage Batteries; and I hereby declare the following to be a full, clear, and exact description of the same.

My invention has relation to electrodes for storage batteries and to the method of producing the active material for same.

It consists, essentially, in the electrolytic reduction of a suitable lead salt in a forming-bath under the following conditions: that the said salt be formed in a mass by some means, so that it shall not disintegrate on immersion in the forming-bath; that the lead salt be soluble in the forming-bath, but not to the extent that the form of the mass (in the shape of plates or other configuration) is altered; that the combination of lead salt and forming-bath is such that with a suitable current density the previously amorphous mass of lead salt is transformed into spongy lead consisting of a mass of threads of lead (technically known as "lead trees") which are generally parallel to each other and perpendicular to the exposed surfaces and which occupy the volume of the untransformed mass. It is further desirable that the untransformed mass have at least a slight superficial conductivity, as thereby the mass of lead trees is more uniform through its volume.

The objects of my invention are to produce an active material of the utmost porosity and conductivity and which will allow the freest possible diffusion of the electrolyte when it is in use, thereby having a maximum capacity per unit weight of same. These objects I accomplish as follows.

The general method may be illustrated by the particular process which I have found to be most convenient.

I take a quantity of a lead oxid or a mixture of lead oxids and moisten it with glycerin or a solution of glycerin and water (preferably water, one part, and glycerin, three parts) and stir to a paste and apply this to a suitable metallic framework or grid or simply embed conductors in it. The paste has the property of setting quickly and firmly. The plates so formed are immersed in a solution of $Na_2CO_3$ (sodium carbonate) and made cathodes in an electrolytic cell. After a certain time the paste becomes completely transformed into spongy lead having a peculiar structure—viz., a compact mass of parallel threads of lead having their axes at right angles to the exposed surface of the plates excepting in the neighborhood of the metallic conducting parts of the frames. There they run more nearly at right angles to the conductors, and at these parts the spongy lead is more dense and is plated onto the frames. These are very important features, for the following reasons: First, said plating insures perfect contact of the spongy lead with the frame; second, when used as electrodes in storage batteries the above thread-like and porous structure allows a free diffusion of the fluid electrolyte and causes also the most uniform discharge possible, at the same time permitting great rapidity of discharge without diminution of electromotive force, thereby allowing the active material more nearly to give up all its chemical energy in the form of electrical energy; third, the tendency to "buckle" the frames is lessened in proportion to the increased porosity. Ordinarily where red lead or litharge mixed with sulfuric acid and water is used in pasting frames and allowed to set there are the following notable and unavoidable disadvantages: First, the mass lacks tenacity and is liable to crumble if unsupported otherwise than by the frames during the process of reduction; second, the still more serious objection of forming an amorphous or non-crystalline mass when finally reduced; third, reduction is never perfect, as traces of lead sulfate are always present. When active material of this character is of uniform density throughout, lacking the aforesaid thread-like structure, the electrolyte has good access only to the outer surface of the plate where used as an electrode and the discharge begins from this portion with an accompanying chemical change from lead to lead sulfate in the positive plate and from lead peroxid to lead sulfate in the negative plate. In both cases there is an expansion of volume in the active material tending to close its pores, and thus rendering access of the electrolyte still more difficult, and the interior is left to a large extent unacted upon. There is an unequal expansion of volume throughout the mass, and consequently the tendency to buckle, which proves so great an evil in most storage batteries. With the structure accomplished by my method of formation there is not only a greatly-increased porosity, but this porosity is of such a sort that the pores form innumerable small yet readily-distinguishable continuous channels entirely through the active material, and even after the change to lead sulfate they remain unclosed. As a result I am able to use grids of extreme lightness, doing away with the heavy cumbrous affairs necessary in ordinary use, greatly reducing the weight of a battery in this direction alone. I need a frame weighing but twenty-five per cent. to fifty per cent. only of the ordinary ones, and consequently I am able to replace this practically "dead" weight by so much more porous "active" material—in other words, the first reason for the claim of "a maximum storage capacity per unit of weight." The discharge from a plate of this porous structure of active material would be most rapid from the center of the mass, where it is least dense and the electrolyte has freest access, were it not for the fact that this material is not as perfect an electrical conductor as the lead frame. As a result the resistance the active material offers acts in the direction of causing quicker discharge in the neighborhood of the conductors, and these two effects counterbalance each other, causing a nearly uniform discharge throughout the mass. Hence the active material itself has a greater weight efficiency. The thread-like structure and resulting porosity I account for by various experiments, as follows: Lead oxid mixed with glycerin has a certain conductivity for electricity after it has set, which materially assists in the superficial reduction of the mass. This paste is also slightly soluble in alkaline solutions, as $Na_2CO_3$, and from such a solution with a suitable current density lead is "plated out" of the solution in the form of lead trees. In this case, therefore, we have lead plated out of the solution onto the conductors and onto the exposed surfaces of the paste in the form of a compact mass of "trees" with the resulting structure before mentioned. Various other materials will satisfy the necessary conditions of conductivity and solubility and give the described structure—e. g., litharge melted or fused to form a compact mass and reduced in an alkaline bath or litharge and red lead mixed with any suitable binder, as linseed-oil, drying-oil, or saccharine solution, &c., the exposed surface rendered conductive by the application of a suitable conducting-powder, as graphite, lead-dust, &c., and reduced in an alkaline bath. Even when glycerin is used the surface conductivity may be increased by "flouring" with graphite, for example, if desired. It is to be noted that in all these forms an alkaline bath is used and for the reason that generally oxids of lead are slightly soluble in alkalies, excepting ammonia, while they are generally insoluble in sulfuric or hydrochloric solutions or water. A variety of such alkaline solutions may be used—such as $Na_2CO_3$, $K_2CO_3$, NaOH, KOH, &c.—in all of which solutions said salts treated as above are found to satisfy the following conditions: first, conductivity; second, slight solubility; third, extreme porosity and thread-like structure of the product. The bath I prefer, however, is a solution of $Na_2CO_3$, (sodium carbonate) (of approximately specific gravity 1.05 to 1.10,) since this is a very common and cheap substance. The reason why this solution or its equivalent $K_2CO_3$ is preferable is that when a lead electrode is used as anode in the reducing or forming process lead is not plated over onto the cathode, as is the case when NaOH, KOH, and other alkalies are used. Where either of these latter are employed, it is better to use an anode, as platinum or carbon. Baths containing other substances, but rendered alkaline by the above alkalies, will serve the same purpose. The mixture of glycerin and lead oxids is most convenient on account of the rapidity and firmness with which it sets. It is also preferable because of the reducing tendency it already shows, glycerin being easily oxidized to glyceric acid, and consequently facilitating reduction. The lead glycerate formed in this mixture is also slightly more soluble in the baths designated than lead oxid. The reduction of these pastes in alkaline baths is effected with great ease and a minimum expenditure of electrical energy—i. e., a smaller forming charge is necessary in order to reduce to spongy lead. No bubbles of hydrogen gas are given off until lead oxid is completely transformed into metallic lead. The operator is thus notified when the forming is complete. Of the importance of the feature of resulting porosity of the product I have already spoken. It is this transformation of the lead salt of the character described and by the means specified to spongy lead that constitutes the essence of my invention. From the positive (i. e., spongy lead—pure lead) plates thus formed I secure my negative (i. e., lead peroxid, $PbO_2$) plates by making them anodes in any suitable electrolyte, care being taken to prevent injurious sulfation. Throughout this change and at its completion the plate still preserves the characteristics of a thread-like porous structure that it has when in the condition of the positive spongy lead. In the form of lead peroxid the plate is now charged and ready for use in a cell containing a suitable electrolyte, as dilute sulfuric acid. The positive in this cell or battery may be a spongy-lead plate formed as above or an electrode of a suitable metal—such as zinc, cadmium, copper, &c.

I do not wish to limit myself to the express chemical elements or compounds specified herein by way of illustration. It is the application that I wish to cover of the principle enunciated early in this specification of the reduction of a mass consisting of a salt of lead in a forming-bath in which said salt is slightly soluble and which mass has the further property of being or being made electrically conductive, the combination of salt and electrolyte being such that lead trees are plated out within the mass. My experience has shown that wherever these conditions are secured the result is a mass of extreme porosity having the above-described structure of good and uniform electrical conductivity and that is not subject to closing of the pores in any stage of the process nor subject to the ordinary forms of deterioration due to rapid discharge.

Having thus described my invention, what I claim, and desire to secure by Letters Patent, is—

1. The process of forming an active material for storage batteries, consisting of suitably binding a mass of lead salt which will retain its conformation after immersion, and reducing it by electrolysis to spongy lead in an electrolyte which is a solvent for the lead salt, and from which solution lead trees essentially parallel to each other are plated out within the mass.

2. The process of forming an active material for storage batteries consisting of suitably binding a mass of lead oxids, rendering its surface electrically conductive, and reducing by electrolysis to spongy lead in an alkaline forming-bath, which is a solvent for the lead salt and from which solution lead trees essentially parallel to each other are plated out within the mass.

3. The process of forming an active material for storage batteries consisting in mixing an oxid of lead with a suitable binder whereby the mass is rendered electrically conductive, and reducing it to spongy lead composed of lead trees essentially parallel to each other, by electrolysis, in an alkaline forming-bath.

4. The process of forming an active material for storage batteries, consisting in mixing an oxid of lead with a glycerin solution, and reducing the set mass by electrolysis in an alkaline forming-bath in which the lead salt is soluble, and from which solution lead trees essentially parallel to each other are plated out within the mass.

5. The process of forming an active material for storage batteries, consisting in rendering a mass of a suitable lead salt electrically conductive, and reducing it to spongy lead, consisting of a mass of lead trees essentially parallel to each other by electrolysis in a forming-bath in which the lead salt is soluble.

6. An active material for storage batteries, composed of a compact mass of lead trees running essentially parallel to each other and perpendicular to its exposed surfaces, said mass occupying the volume of the unreduced salt from which it is formed.

In witness whereof I have hereunto set my hand.

WALTER E. WINSHIP.

Witnesses:
S. H. NOURSE,
CHAS. E. TOWNSEND.